No. 753,499. PATENTED MAR. 1, 1904.
C. KLÄRLE.
MEANS FOR LOWERING LOADS APPLICABLE AS LIFE SAVING APPARATUS.
APPLICATION FILED JULY 14, 1902.
NO MODEL.

WITNESSES:—
Ellis Owen
John Smith

INVENTOR.—
C. Klärle
by W. Evans
attorney.

No. 753,499. Patented March 1, 1904.

UNITED STATES PATENT OFFICE.

CHRISTIAN KLÄRLE, OF FRANKFORT-ON-THE-MAIN, GERMANY.

MEANS FOR LOWERING LOADS APPLICABLE AS LIFE-SAVING APPARATUS.

SPECIFICATION forming part of Letters Patent No. 753,499, dated March 1, 1904.

Application filed July 14, 1902. Serial No. 115,474. (No model.)

*To all whom it may concern:*

Be it known that I, CHRISTIAN KLÄRLE, a subject of the German Emperor, residing at Heinrichstrasse, Frankfort-on-the-Main, Germany, have invented certain new and useful Improvements in Means for Lowering Loads Applicable as Life-Saving Apparatus, of which the following is a specification.

This invention relates to means for lowering loads by means of a rope or belt and is of special application to a life-saving apparatus.

The invention is illustrated in the accompanying drawings, in which—

Figure 1:
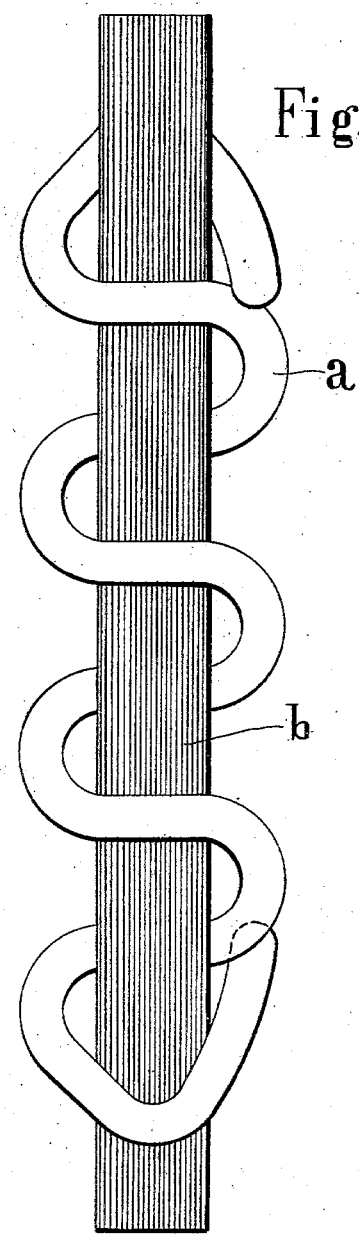
Figure 2:
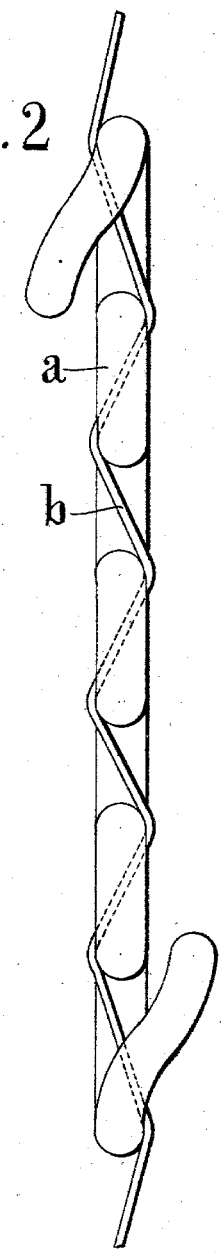
Figure 3:
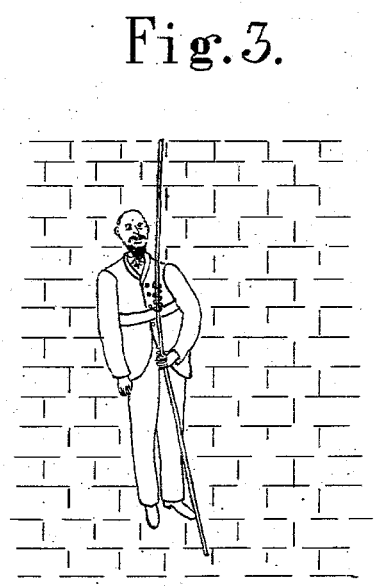

Figures 1 and 2 are front and side elevations, respectively, of a device applied according to the invention. Fig. 3 illustrates the employment thereof.

The invention consists of a brake or load-carrying device formed of a bent metal rod $a$, which is formed serpentine fashion and is provided with hooks or open loops at each end. From the lower hook or loop the load is hung. The connection of the brake or load-lowering device $a$ to the rope or belt $b$ is effected by intertwining the rope or belt alternately through the parallel and adjacent parts of the brake or lowering device $a$. Inasmuch as the brake or lowering device is made of a single integral member with no separate movable parts, the accidental disarrangement or failure of the device is obviated.

It will be understood that the brake action is effected by the friction of the rope or belt on the adjacent parallel parts of the device, the friction being in proportion to the tension exercised on the rope, which can be readily controlled when the device is used for life-saving, the body of the person being hung from the lower hook or open loop of the device, as illustrated in Fig. 3.

It will be understood that in exercising tension on the rope or belt beneath the device the lowering is retarded or stopped, while on releasing the tension the lowering may be effected as required.

The extremities of the hooks or open loops are diverted inwardly and respectively in front and behind the load-supporting member, leaving a space between the respective hooks or open loops through which the suspension member may be introduced when the load-supporting member is mounted in position.

What I claim as my invention, and desire to secure by Letters Patent, is—

A load-lowering device directly applicable upon a suspension member at any part thereof, consisting of a load-supporting member of zigzag form, said load-supporting member terminating in threading-hooks, the extremities of which are brought inwardly and into a position respectively in front and behind the load-supporting member, substantially as described.

In testimony whereof I have hereunto signed my name to this specification in the presence of two subscribing witnesses.

CHRISTIAN KLÄRLE.

Witnesses:
KARL BAISE,
JEAN GRUND.